July 15, 1930. F. M. REID 1,770,583
TANDEM WHEELED VEHICLE
Filed Feb. 7, 1927    2 Sheets-Sheet 2

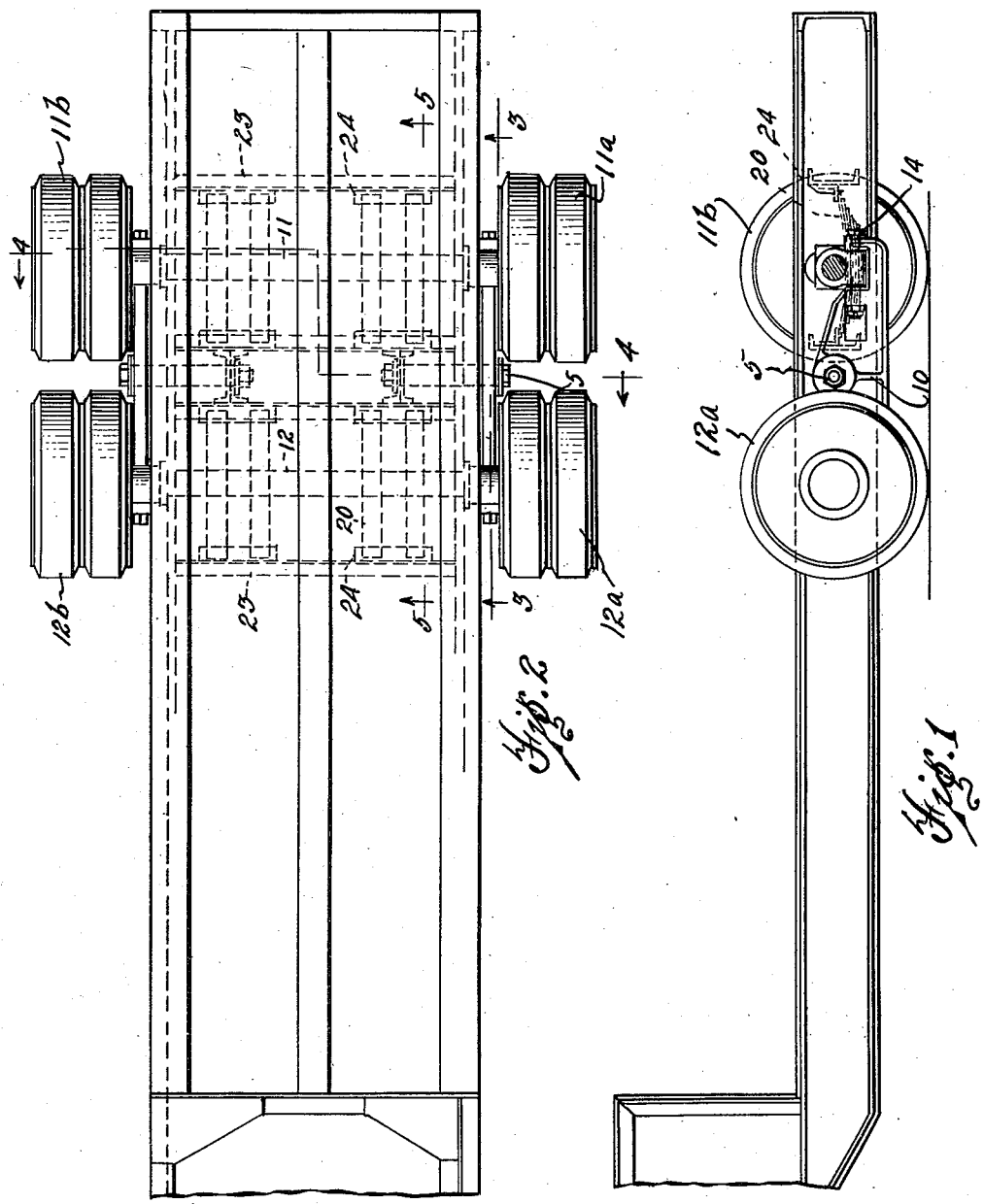

INVENTOR.
Frederick Malcolm Reid
BY
ATTORNEY.

Patented July 15, 1930

1,770,583

UNITED STATES PATENT OFFICE

FREDERICK MALCOLM REID, OF DETROIT, MICHIGAN, ASSIGNOR TO FRUEHAUF TRAILER COMPANY, OF DETROIT, MICHIGAN, A CORPORATION OF MICHIGAN

TANDEM-WHEELED VEHICLE

Application filed February 7, 1927. Serial No. 166,400.

The present invention relates to a tandem wheeled vehicle, and it has to do particularly with a vehicle designed primarily for transporting heavy loads.

Tandem wheel construction has been proposed heretofore, and the construction has been used on busses for passenger transportation, and the axles have been joined by springs which function to permit the necessary relative movement as between the front and rear wheels. It has been proposed to provide tandem wheels for vehicles for heavy duty wherein an axle is provided at its ends with an equalizer bar or rocker arm which in turn carries stub axles for the wheels. With this construction the stub axles are supported only at one side of the wheel, and as a result, there is a twisting strain on the stub axle which is undesirable. It has been proposed to support these stub axles by rocker arms at both ends of the stub axle with a wheel mounted between, in order to overcome this objectionable twisting, but this construction is also objectionable because a wheel or tire change cannot be made without removing one of the rocker arms.

The present invention aims to provide a tandem wheel construction suitable for carrying loads heavier than the loads, which the above mentioned type of construction, which has been used on passenger busses, is adapted to carry, and at the same time the invention contemplates a construction which eliminates the objectionable twisting strains, and in which wheel change or tire change can be readily made.

According to the invention, two complete axles are provided, one of which is mounted to the rear of the other, and both axles extend through the frame and carry wheels on opposite ends. The two axles are supported at either side of the vehicle by an equalizer bar or rocker arm, and the connection between each axle and each rocker arm is such as to allow for the necessary relative movement when one wheel raises or lowers, in response to road irregularities, so that there is no twisting action on the equalizer bars. The invention further contemplates a heavy duty tandem wheel construction which makes use of a spring action. The load is carried primarily by direct connections between the frame, the equalizer bar and the axles, but the spring action comes into play upon relative vertical movement of any one of the wheels.

In the accompanying drawings:

Fig. 1 is a side elevation of a part of a vehicle which is partly cut away, showing the tandem wheel construction.

Fig. 2 is a top plan view showing how the axles extend through the vehicle from one side to the other.

Figure 3:
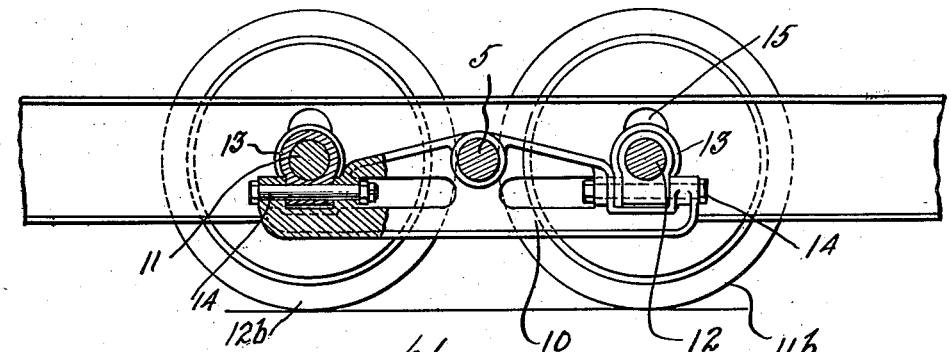
Fig. 3 is a sectional view taken on line 3—3 of Fig. 2.

A vehicle is shown in the drawings as being in the form of a trailer which is adapted to be drawn by a tractor. The trailer has a frame 1 which is made up of built up steel beams 2 and provided with a load supporting platform 3. The forward end of the trailer may be supported by wheels (not shown), or it may be supported by the wheels and frame of a tractor, in which case the forward end would rest upon the tractor and would be provided with no wheels of its own.

Figure 4:
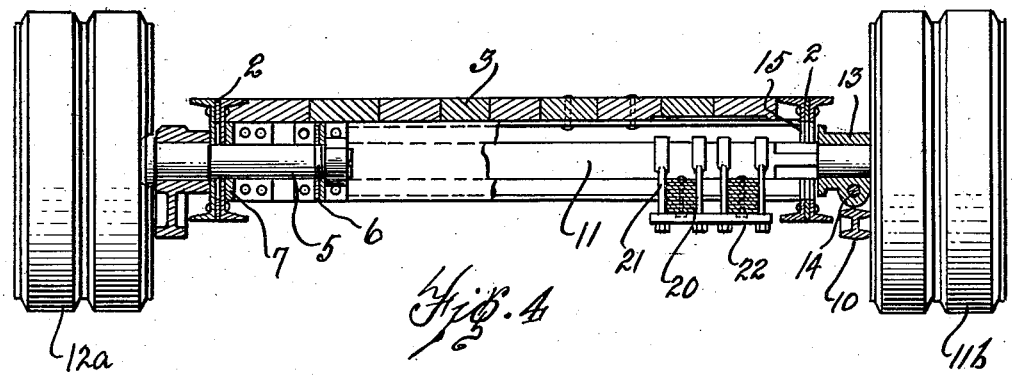
Fig. 4 is a sectional view taken on line 4—4 of Fig. 2.
Figure 5:
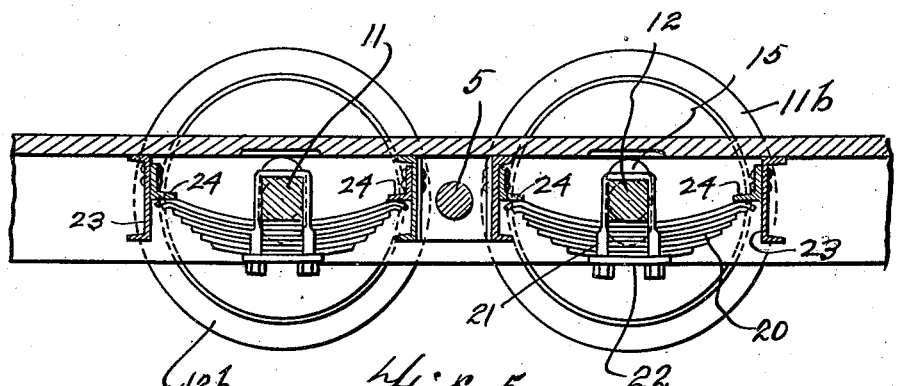
Fig. 5 is a sectional view taken on line 5—5 of Fig. 2 showing the arrangement of the springs.

Mounted on the frame at each side thereof is a bolt-like pivot member 5. For mounting this member in the frame, suitable supports 6 and 7 may be provided through which the pivot member extends (Fig. 4). Pivotally carried by each member 5 is an equalizer bar or rocker arm 10, which rocker arm extends longitudinally of the vehicle, forward and rearward of the pivot member. Axles 11 and 12 are supported at the ends of the equalizer bar, and each axle is connected to the equalizer bar by means of a shackle 13 which extends around the axle, the shackles being connected to the equalizer bar by bolts 14, the equalizer bar having portions for engaging each side of the shackle and for receiving the bolts.

The axles extend transversely across the vehicle, and each has a wheel mounted on its ends, the axle 12 carrying wheels $12^a$ and $12^b$, the axle 11 carrying wheels 11ª and 11ᵇ. The steel beam members of the frame are provided with elongated slots 15 which are disposed in a vertical position through which the axles extend, to allow for movement of the axles with respect to the frame as the wheels move over irregularities in the roadway.

With the construction thus far described, it will be understood that as the vehicle is drawn along the roadway, each wheel may move relative to the other wheels in response to road irregularities. For example, if the wheel 12ª meets with a projection, it will raise with respect to the wheel 11ª, causing a rocking of the equalizer bar around the pivot member 5. When this happens, the axle 12 is moved from a horizontal position to a slightly tilted position, or in other words, to a position which is at an angle to the horizontal. Now the equalizer bars cannot tilt in this manner by reason of their mounting upon the pivot members 5. However, the shackle and bolt construction 13 and 14 permit tilting of the axle, and the shackle turns on the bolt 14. With this construction there is no twisting action on either equalizer bar when any one of the wheels raises or lowers with respect to the other wheels.

This tandem wheel construction is designed for use for transporting very heavy loads, and in this type of vehicle it is advantageous to have a low platform and frame. The construction makes possible a low platform and frame without involving the relatively expensive operations of making the frame with an offset, or by offsetting the axles to permit of a lowered frame. The equalizer bars are pivotally mounted at an intermediate point in the frame members, and the axles extend through the frame in the elongated openings provided therefor. This reduces the manufacturing costs and makes possible use of a straight frame and straight axles. The openings in the frame members are sufficiently elongated to take care of the extreme movements of the axles.

Each axle is provided with springs 20 which may be secured to the axles by U-bolts 21 and a plate 22 (Fig. 4). The frame of the vehicle is provided with transverse members 23, and these transverse members are provided with spring engaging devices 24, which may take the form of angle irons bolted or riveted to the transverse members. As will be seen by reference to Fig. 1, and Fig. 2, the ends of the springs engage the devices 24.

In the operation of this construction, assume that the wheel 12ª (Fig. 2) rides up on a projection in the roadway, and the wheel 11ª stays in normal position. The frame and load is thus lifted because the pivot point 5 also rises, but the frame does not rise as high as the wheel 12ª but rises only approximately half as high. At this time the springs 20, which are on the axle, are deflected as the axle raises with respect to the spring engaging devices of the frame. The springs, in effect, tend to raise the frame so that part of the weight of the frame and its load are delivered through the springs. Now, when the wheel 12ª drops off the projection in the roadway, which may be sudden, the dropping of the frame and load is cushioned because the springs are pushing upwardly on the frame. Thus, the construction serves in the nature of shock absorbing devices, and while the load is carried primarily through the rigid connections, the springs come into play upon relative movement of the wheels and axles. The operation of the wheel 12ª applies to all wheels. In the form shown, each axle is provided with two of such cushioning springs, which is desirable in vehicles for carrying extremely heavy loads, but of course in vehicles for carrying lighter loads, one spring would be sufficient.

It will be seen that the invention provides for a low frame and platform, eliminates any objectional twisting which occurs with the use of stub axles above mentioned, makes possible easy change of wheels or tires because there is no structure on the outside of the wheels to interfere with their removal, and that the invention also provides for cushioning the frame and load in a manner of absorbing shocks incident to relative raising and lowering of the wheels as the vehicle moves along a roadway.

The tandem wheel construction of this invention has been described in connection with a vehicle of the trailer type. The invention, however, is applicable to vehicles which move under their own power. For this purpose the axles could be made of the wheel driving type having a connection with an engine, as for example a worm-and-gear type of drive, in much the same manner as the above referred to tandem wheel construction which is now used on passenger carrying busses.

Claims:

1. In a vehicle, a tandem wheel construction comprising in combination with a vehicle frame, a rocker arm mounted at each side of the frame for pivotal movement in a vertical plane, a pair of axles extending transversely through the frame, one of said axles being carried by the forward portion of the rocker arms and the other axle being carried by the rear portions of the rocker arms, said frame being provided with openings through which the axles extend, said openings being of sufficient size to permit movement of the axles relative to the frame upon rocking of the rocker arms.

2. In a vehicle, a tandem wheel construction comprising in combination with a vehicle frame, a rocker arm mounted at each side of the frame for pivotal movement in a vertical plane, a pair of axles extending transversely through the frame, one of said axles being carried by the forward portions of the rocker arms and the other axle being carried by the rear portions of the rocker arms, said frame being provided with elongated vertically disposed openings through which the axles extend whereby the axles may move vertically with respect to the frame in said openings upon rocking of the rocker arms.

3. In a vehicle, a tandem wheel construction comprising in combination with a vehicle frame having a load-receiving platform, a rocker arm mounted at each side of the frame to pivot in a vertical plane, a pair of straight axles extending transversely across the frame, said axles extending through the frame and underlying the platform, and the frame being provided with openings through which the axles extend, and a wheel mounted on each end of each axle, whereby the said load-receiving platform is not materially higher from the ground than the radius of said wheels.

4. In a vehicle, a tandem wheel construction comprising in combination with a vehicle frame, a rocker arm mounted on a fixed pivot at each side of the vehicle frame and adapted to rock in a vertical plane, a pair of axles extending transversely across the frame, one of said axles being carried by the forward ends of the rocker arms and the other axle being carried by the rearward ends of the rocker arms both by fixed pivoted connections, and a spring associated with each wheel, said springs being adapted to engage the frame and exert an upward force thereon when the axle to which they are attached moves upwardly with respect to the other axle by rocking movement of the rocker arms.

5. In a vehicle, a tandem wheel construction comprising in combination with a vehicle frame, a rocker arm mounted adjacent each side of the frame on a fixed pivot member so as to rock in a vertical plane, a pair of axles extended transversely across the vehicle frame, a wheel at each end of each axle, said fixed pivot members extending transversely of the frame, a longitudinally extending pivot member carried at each end of each rocker arm and means connecting the axles to said pivot members in a non-resilient weight supporting manner while permitting relative pivotal movement between the axles and the rocker arms.

6. In a vehicle, a tandem wheel construction comprising in combination with a vehicle frame, a rocker arm mounted adjacent each side of the frame on a fixed pivot member so as to rock in a vertical plane, a pair of axles extending transversely across the vehicle frame, a wheel at each end of each axle, said fixed pivot members extending transversely of the frame, a longitudinally extending pivot member carried at each end of each rocker arm and means connecting the axles to said pivot members in a non-resilient weight supporting manner while permitting relative pivotal movement between the axles and the rocker arms and springs associated with each axle positioned so as to be flexed upon vertical movement of an axle relative to the frame due to rocker arm movements, whereby to cushion movements of the frame caused by said rocker arm movements.

In testimony whereof I affix my signature.
FREDERICK MALCOLM REID.